(12) United States Patent
Andersen et al.

(10) Patent No.: US 10,365,159 B2
(45) Date of Patent: Jul. 30, 2019

(54) SPECTROMETER SYSTEM AND A METHOD FOR COMPENSATING FOR TIME PERIODIC PERTURBATIONS OF AN INTERFEROGRAM GENERATED BY THE SPECTROMETER SYSTEM

(71) Applicant: Foss Analytical A/S, Hilleroed (DK)

(72) Inventors: Steen Kjaer Andersen, Hilleroed (DK); Mads Lykke Andersen, Hilleroed (DK)

(73) Assignee: Foss Analytical A/S, Hilleroed (DK)

( * ) Notice: Subject to any disclaimer, the term of this patent is extended or adjusted under 35 U.S.C. 154(b) by 117 days.

(21) Appl. No.: 15/539,217

(22) PCT Filed: Feb. 2, 2015

(86) PCT No.: PCT/IB2015/050778
§ 371 (c)(1),
(2) Date: Jun. 23, 2017

(87) PCT Pub. No.: WO2016/124970
PCT Pub. Date: Aug. 11, 2016

(65) Prior Publication Data
US 2018/0328788 A1 Nov. 15, 2018

(51) Int. Cl.
*G01J 3/453* (2006.01)
*G01J 3/45* (2006.01)
*G01J 3/06* (2006.01)

(52) U.S. Cl.
CPC .......... *G01J 3/4535* (2013.01); *G01J 3/06* (2013.01); *G01J 3/45* (2013.01)

(58) Field of Classification Search
CPC .. G01J 3/06; G01J 2003/062; G01J 2003/063; G01J 3/45; G01J 3/453; G01J 3/4532; G01J 3/4535
See application file for complete search history.

(56) References Cited

U.S. PATENT DOCUMENTS 4,193,693 A * 3/1980 Frosch ................. G01J 3/4535
356/452
4,655,587 A * 4/1987 Wijntjes ............... G01J 3/4535
318/640

(Continued)

FOREIGN PATENT DOCUMENTS

EP 0401599 A2 12/1990
JP 59040133 A * 3/1984 ............ G01J 3/4535

OTHER PUBLICATIONS

International Search Report PCT/ISA/210 for International Application No. PCT/IB2015/050778 dated Nov. 3, 2015.

(Continued)

*Primary Examiner* — Michael A Lyons
(74) *Attorney, Agent, or Firm* — Harness, Dickey & Pierce, P.L.C.

(57) ABSTRACT

A spectrometer system comprises a scanning interferometer; a drive system mechanically coupled to a movable reflector element of the scanning interferometer and operable to effect reciprocation of the movable reflector element at a plurality, preferably more than two, for example three, different scan speeds; a detector arrangement configured to sample at equidistant time intervals an interferogram formed by the scanning interferometer to generate a sampled interferogram; and a data processor is adapted to acquire a sampled interferogram at each of the plurality of different scan speeds and to perform a relative comparison of the content of the so acquired plurality of sampled interferograms.

9 Claims, 4 Drawing Sheets

(56) References Cited

U.S. PATENT DOCUMENTS

| | | | | |
|---|---|---|---|---|
| 5,539,518 A | * | 7/1996 | Bennett | G01J 3/2823 |
| | | | | 356/452 |
| 5,696,582 A | * | 12/1997 | Barwald | G01J 3/4535 |
| | | | | 356/451 |
| 5,771,096 A | | 6/1998 | Andersen | |
| 2003/0067606 A1 | * | 4/2003 | Simon | G01J 3/453 |
| | | | | 356/451 |
| 2013/0120755 A1 | * | 5/2013 | Harig | G01B 11/2441 |
| | | | | 356/455 |
| 2016/0131528 A1 | * | 5/2016 | Ando | G01B 9/02015 |
| | | | | 356/452 |

OTHER PUBLICATIONS

Written Opinion of the International Searching Authority PCT/ISA/237 for International Application No. PCT/IB2015/050778 dated Nov. 3, 2015.

* cited by examiner

SPECTROMETER SYSTEM AND A METHOD FOR COMPENSATING FOR TIME PERIODIC PERTURBATIONS OF AN INTERFEROGRAM GENERATED BY THE SPECTROMETER SYSTEM

CROSS-REFERENCE TO RELATED APPLICATIONS

This application is a National Phase under 35 U.S.C § 371 PCT International Application No. PCT/IB2015/050778, which has an international filing date of Feb. 2, 2015, the entire contents of which is hereby incorporated by reference.

The present invention relates to a spectrometer system and to a method for compensating for time periodic perturbations of an interferogram generated by the spectrometer system and in particular to those perturbations of an interferogram recorded using a spectrometer system comprising a scanning Fourier Transform (FT) interferometer.

It is known to provide a spectrometer system having a scanning FT interferometer, such as that of the Michelson type. The interferometer broadly comprises a beamsplitter and two or more reflectors, such as mirrors or retro-reflectors, with at least one of the reflectors being arranged to be reciprocally movable. Collimating lenses or other optics may also be included in the interferometer but are not fundamental to its operating principle.

Generally, for example when such an interferometer is employed for optical spectroscopy, an observation beam consisting of relatively broad band radiation in a wavelength region of interest enters the interferometer, typically after it having interacted with a sample under observation, and strikes the beamsplitter. This observation beam is split into essentially two parts of equal intensity at the beamsplitter. A first beam is reflected by the beamsplitter and travels along a first 'arm' of the interferometer to the first reflector from where it is reflected back to the beamsplitter. A second beam is transmitted through the beamsplitter and travels along a second 'arm' to the second reflector from where it is also reflected back to the beamsplitter to overlap the reflected first beam. The retardation, $\delta$, is the difference between the optical path lengths of the two arms and depending on the retardation each wavelength of the spectral source may interfere destructively or constructively when the back-reflected light in the two arms overlap on the beamsplitter. The intensity pattern of the overlapping, interfering light as a function of retardation is hereinafter referred to as an observation interferogram. The observation interferogram is recorded by a detector as one or more of the reflectors (commonly a one of the reflectors) is/are moved at a constant speed to create cyclic excursions of the related optical path and hence a cyclic optical path length difference between the first and the second beams.

Sampling of the interference signal received at the detector is made in a time equidistant manner (i.e. at equal intervals of optical path-length difference) as determined for example by triggering on specific points (e.g. zero cross-over points) in an interferogram of a co-interfering laser. In this way very precise sampling of the observation interferogram in terms of path-length difference can be achieved. The resulting sampled observation interferogram is periodic in space and contains the frequency distribution of the modulated light which can then be Fourier transformed to a wavelength (or frequency) dependent intensity spectrum.

If however there is some perturbation associated with the spectrometer system, particularly with the interferometer, which is periodic in time then, due to the constant scan speed of the reflector, this will appear as a false frequency component of the modulated light and as such will give rise to artefacts in the intensity spectrum at the affected frequencies. Such temporally periodic perturbations can come in many forms, for example a temporally periodic alignment variation of the optical system, induced for example by an external vibration; in the case of a transmission measurement, a temporally periodic path-length variation, possibly again due to external vibration. Temporally periodic electromagnetic disturbances of the detector and its electronic circuits may also appear as false frequency components of the modulated light.

Such temporally periodic perturbations can adversely affect the performance of the spectrometer system since these perturbations are impossible to distinguish from the real signal without prior knowledge of their nature.

It is an aim of the present invention to at least identify artefacts in an observation interferogram resulting from such temporally periodic perturbations and preferably to correct resulting intensity spectra to mitigate the effect of such artefacts.

According to a first aspect of the present invention there is provided a spectrometer system comprising a scanning interferometer; a drive system mechanically coupled to a movable reflector element of the scanning interferometer and operable to effect reciprocation of the movable reflector element; a detector arrangement configured to sample an interferogram formed by the scanning interferometer at equidistant length intervals to generate a sampled interferogram; and a data processor adapted to acquire the sampled interferogram and perform a Fourier transform operation on it; wherein the drive system is operable to effect the reciprocation of the movable reflector element at a plurality of different speeds and wherein the data processor is adapted to acquire a sampled interferogram at each of the plurality of different speeds and to perform a relative comparison of the content of the so acquired plurality of sampled interferograms. By obtaining interferograms at a plurality of different scan speeds and hence sampling frequencies, a perturbation which is periodic in time will appear as a plurality of different periodicities in the recorded interferograms which may then be identified through the relative comparison of the spectra.

In some embodiments the levels and possibly the frequencies of the perturbations that are periodic in time may be monitored over time. This may be used to troubleshoot or predict problems in the operation of the spectrometer system.

In some embodiments the data processor is adapted to process the content of the sampled interferograms as a comparison of the content of intensity spectra generated by the performance of the Fourier transform operation on each of the sampled interferograms. The intensity spectra that result from Fourier transforming each of the sampled interferograms are then each disturbed by the perturbation at a different spectral frequency given by the frequency of the real perturbation and the different scan speeds.

In some embodiments the drive system is operable to effect the reciprocation of the movable reflector element at three or more, preferably three, different speeds. The perturbation can then be identified by a relative comparison of the content, usefully the content of the intensity spectra, of the sampled interferograms at the at least three scan speeds.

Usefully, the data processor is adapted to process the content to generate a single corrected intensity spectrum formed as a weighted average of the intensity spectra obtained from the sampled interferograms. In some embodiments the spectral contribution from each intensity spectrum to this single corrected intensity spectrum is weighted by how similar (conversely, how different) that intensity spectrum is to the other intensity spectra of the plurality, such as to a mean intensity spectrum generated from all of the plurality of intensity spectra. In this way the parts of the intensity spectrum that is disturbed by the perturbation is re-formed by the unperturbed parts of the other intensity spectra.

By doing this it is possible to strongly reduce the effect of a perturbation which is periodic in time on an intensity spectrum obtained from an acquired interferogram without destroying the signal to noise ratio in the spectral regions that are unaffected by the perturbation. Advantageously, such a weighting does not degrade signal to noise ratio for a system that is not disturbed.

According to a second aspect of the present invention there is provided a method for correcting for time periodic perturbations in an interferogram generated in a spectrometer system according to the first aspect of the present invention comprising the steps of collecting for access by a data processor a plurality of sampled interferograms each obtained at a different one of a plurality of different reciprocation speeds of the movable reflector element; performing in the data processor a Fourier transform operation on each of the plurality of sampled interferograms to generate a same plurality of intensity spectra; comparing in the data processor the plurality of intensity spectra to identify differences there between; and generating a corrected intensity spectrum mitigating the differences.

In some embodiments of the method according to the present invention the differences are stored as a weighting for each intensity spectrum with the weighting for an intensity spectrum representing the similarity between the intensity spectrum and the remaining intensity spectra of the plurality and wherein the corrected intensity spectrum is generated as a weighted average of the plurality of intensity spectra. In this way the parts of the intensity spectrum that is disturbed by the perturbation is re-formed by the unperturbed parts of the other intensity spectra.

Thus, it is possible to strongly reduce the effect of a perturbation which is periodic in time on an intensity spectrum obtained from an acquired interferogram without destroying signal to noise ratio in the spectral regions that are unaffected by the perturbation. Advantageously, such a weighting does not degrade signal to noise ratio for a system that is not disturbed.

An embodiment of the spectrometer system will now be described together with a method of its operation with reference to the drawings of the accompanying figures of which:

Figure 1:
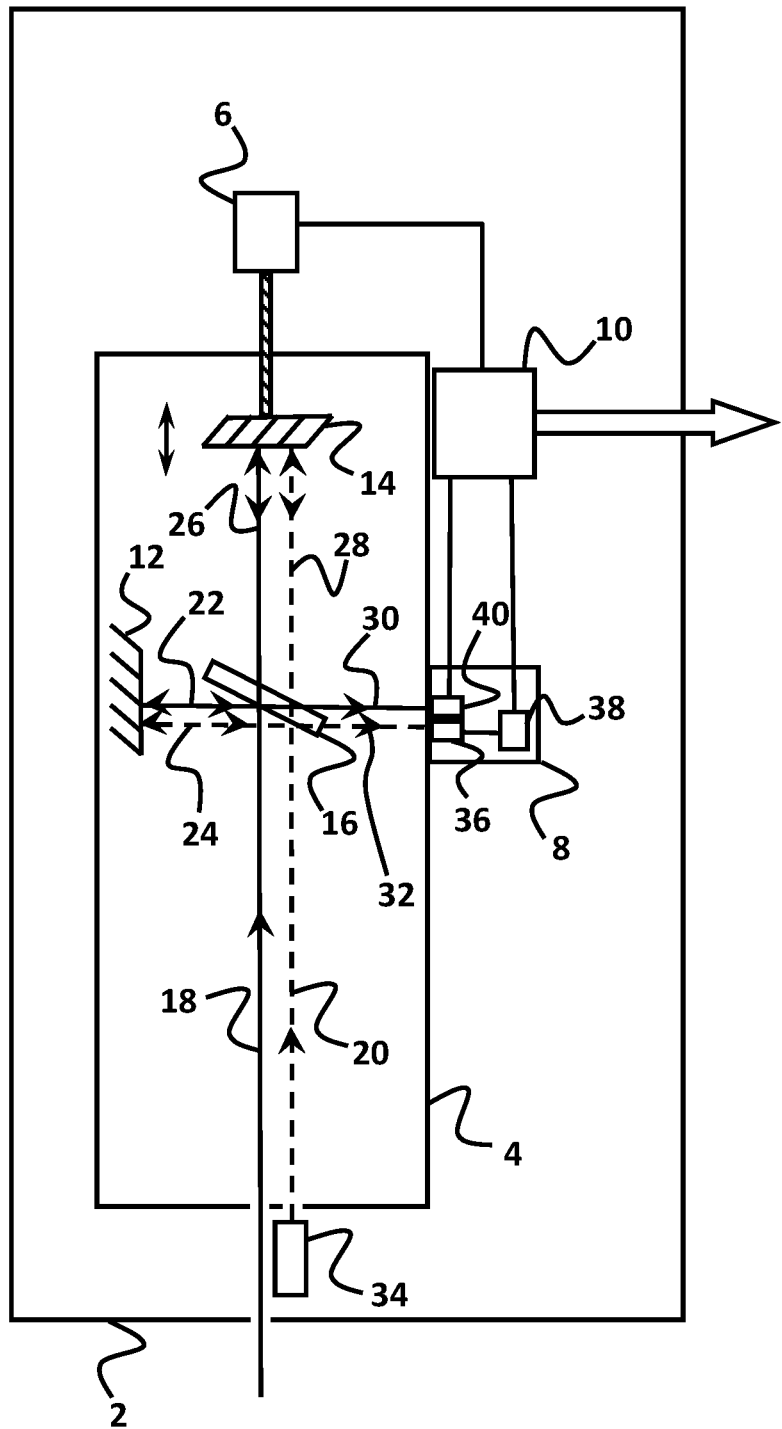
FIG. 1 shows schematically a spectrometer system according to the present invention.
Figure 3:
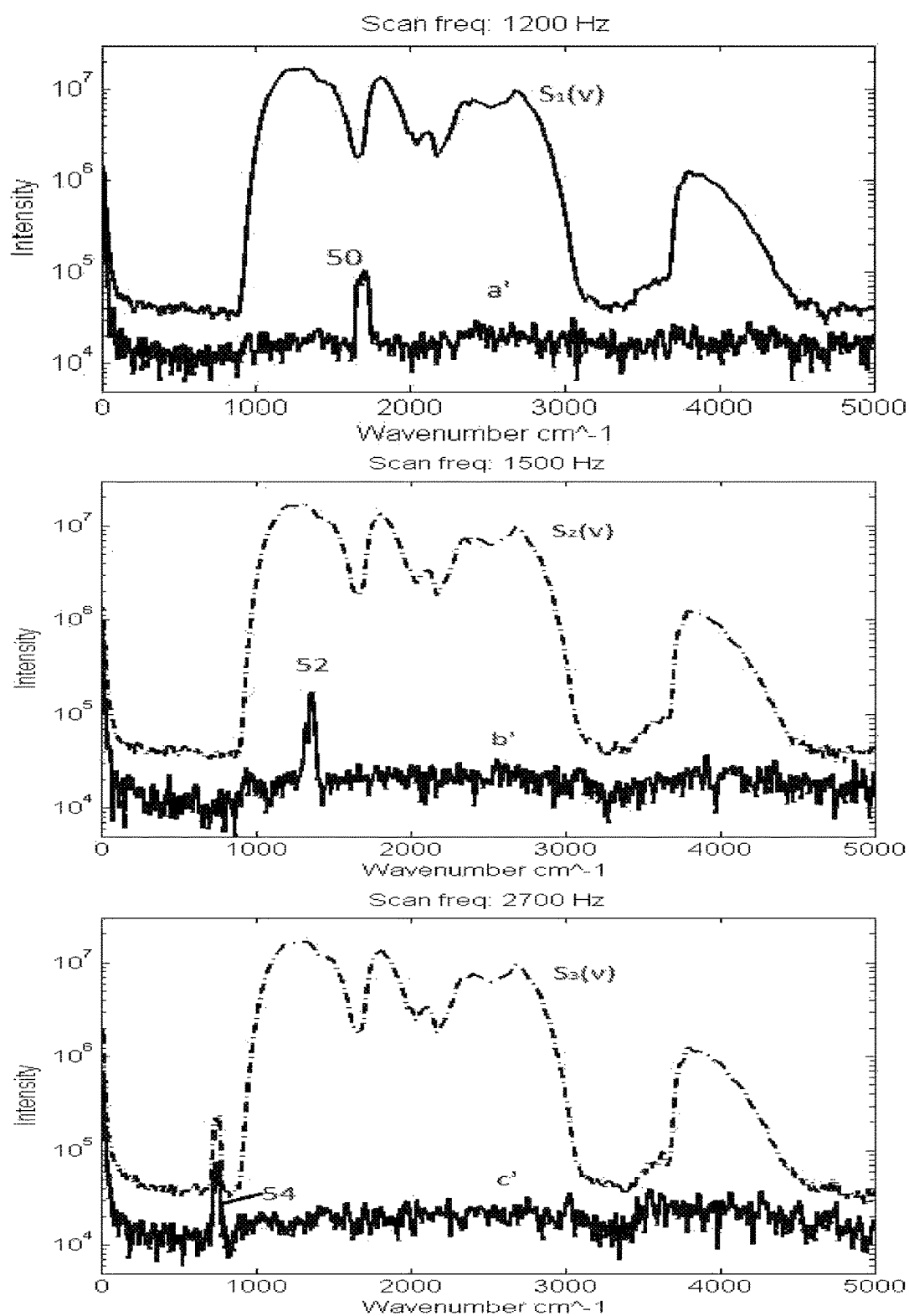
Figure 4:
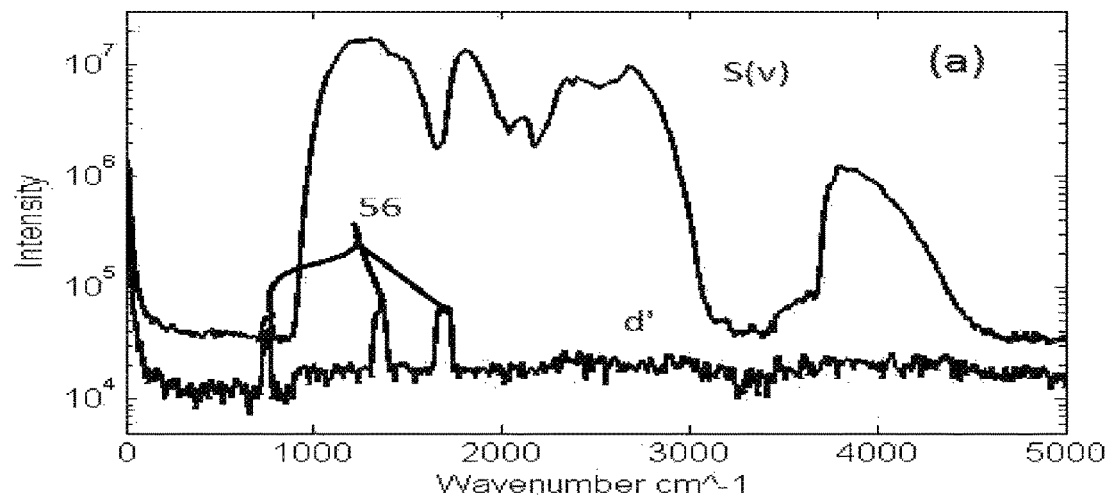
Figure 4:
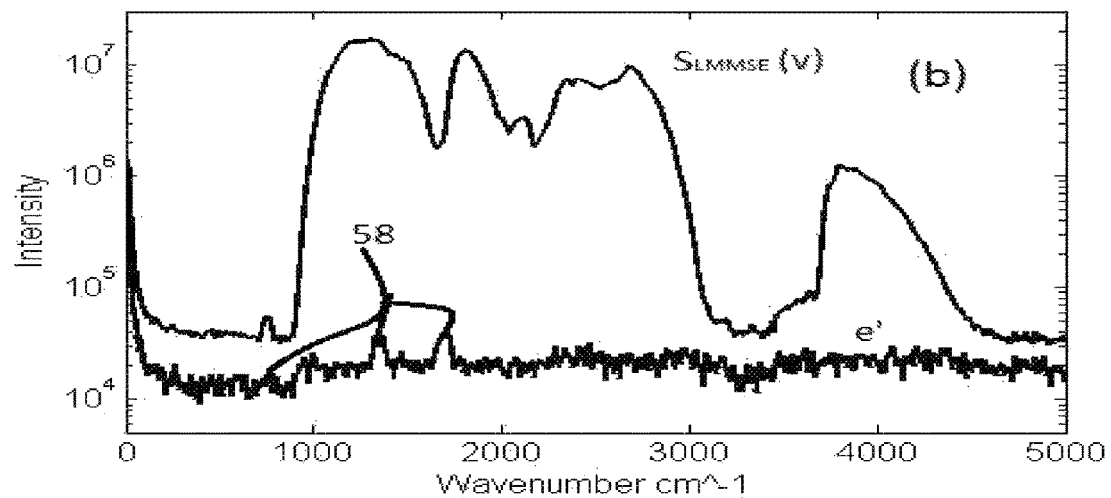

FIG. 3 illustrates spectra obtained at different sampling frequencies (scan speeds); and FIG. 4 illustrates corrected intensity spectra generated according to the method of the present invention Considering now the exemplary spectrometer system 2 which is illustrated schematically in FIG. 1 as comprising a scanning interferometer 4; a drive system 6; a detector arrangement 8; and a data processor 10. The scanning interferometer 4 is, in the present embodiment, a Michelson type scanning interferometer comprising basically of a fixed mirror 12, a reciprocatingly translatable movable mirror 14 and a beamsplitter 16 disposed relative the fixed mirror 12 and the movable mirror 14 to split an incident beam 18;20 into a first part 22;24 and a second part 26;28 of substantially equal intensity. The first part 22;24 is reflected by the beamsplitter 16 to travel along a first arm, delimited by the fixed mirror 12, from which it is reflected back to the beamsplitter 16. The second part 26;28 is transmitted through the beamsplitter 16 to travel along a second arm, delimited by the reciprocatingly translatable movable mirror 14, from which it is reflected back to the beamsplitter 16 to overlap the reflected first part 22;24. The two parts 22,26; 24,28 will interfere constructively or destructively at the beamsplitter 16 depending on the path difference (retardation $\delta$) between the optical path lengths of the first and the second arms to form an interferogram 30;32 which is made incident on and is recorded by detector arrangement 8.

Conventionally, and as is illustrated in FIG. 1, a highly monochromatic reference source (here for example a laser reference source 34) is provided to generate the incident beam 20 which, as described above, eventually forms the interferogram 32 for detection by a reference detector 36 of the detector arrangement 8. The output of this reference detector 36 is passed to a zero-crossing detector 38 which comprises circuitry to detect zero crossings of the interferogram 32 generated by the laser reference source 34 and to output trigger signals in dependence of the detected zero-crossings for triggering sampling of the interferogram 30 incident on an observation detector 40 of the detector arrangement 8. These trigger signals are in the present embodiment illustrated as controlling the operation of the data processor 10 to acquire output of the observation detector 40 for a short interval after receipt of a trigger signal and store the acquired output as a sampled interferogram. Alternatively the trigger signals may control the operation of the observation detector 40 to generate a periodic output for acquisition by the data processor 10.

In use an observation beam enters the interferometer 4 to provide the incident beam 18 simultaneously with the incident beam 20 from the laser reference source 34 which incident beam 18, as described above, eventually forms the interferogram 30 for detection by the observation detector 40 of the detector arrangement 8. Typically the observation beam (providing incident beam 18) is a broad-band beam and enters the interferometer 4 from external the spectrometer system 2 after it having interacted with a sample under observation. In some embodiments the observation beam 18 may be generated within the spectrometer system 2 and the sample under observation may then be removably inserted into the path of this observation beam 18 within the spectrometer system 2.

The spectrometer system 2 thus far described will be recognised by those skilled in the art as being of conventional construction and operation.

The drive system 6 is mechanically coupled to the reciprocatingly translatable movable mirror 14 and is operable to effect its reciprocation. In the present exemplary embodiment, by way of illustration only, the drive system 6 comprises a worm drive or other linear actuator and is designed drive the movable mirror 14 at a constant speed to create cyclic changes in the retardation, $\delta$, of the interferometer 4. In the present invention the drive means 6 is adapted to selectively generate a plurality, preferably greater than two, such as three, different speeds at which to reciprocate the movable mirror 14 (so called 'scan-speeds'). The data processor 10 is configured to acquire and store a sampled interferogram for each of the plurality of scan speeds of the movable mirror 14 and to make a relative comparison of the content of each of the stored sampled interferograms in order to determine the presence of frequency dependent artefacts. Artefacts which result from a perturbation which is periodic in time will appear as a plurality of different periodicities in the plurality of stored sampled interferograms and therefore at a different frequency (or wavelength) in an intensity spectrum resulting from a Fourier transform operation in the data processor 10 on the stored sampled interferograms for each of the plurality (here three) of different scan speeds.

Figure 2:
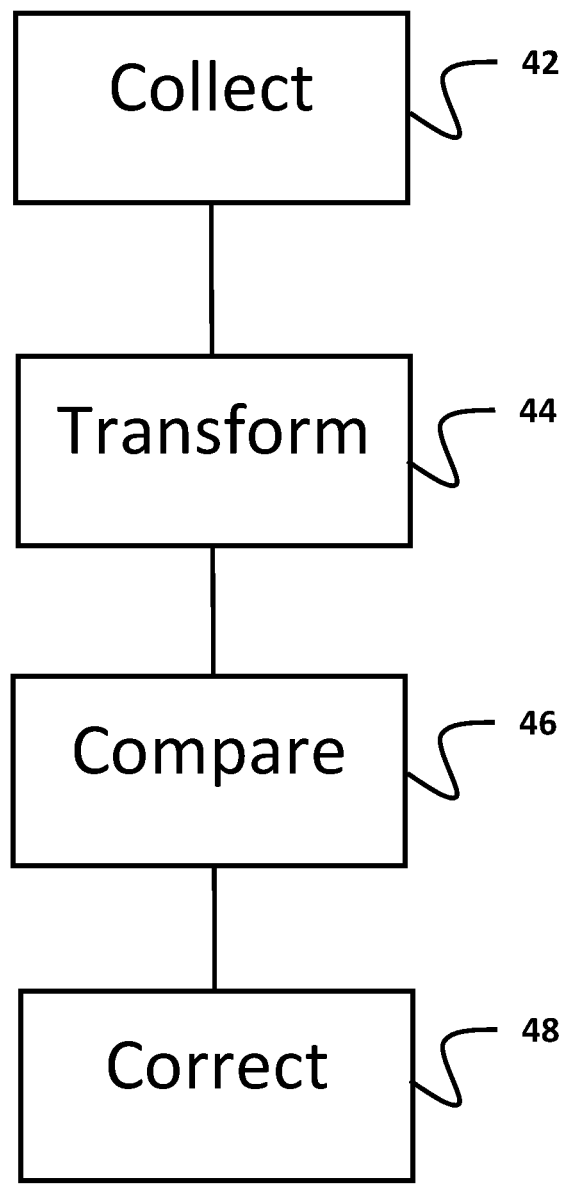
FIG. 2 illustrates an embodiment of a method according to the present invention for implementation in the spectrometer system of FIG. 1.

An exemplary method for correcting for the effect of temporally periodic perturbations on an interferogram which has been generated in a scanning interferometer based spectrometer, such as the spectrometer 2 of FIG. 1, will now be described in greater detail with reference to FIG. 2.

At a Collection Step 42 a plurality of sampled interferograms, each generated at a one of a plurality, in the present embodiment three, of scan speeds of the reciprocatingly translatable movable mirror 14 are collected and stored in the data processor 10.

At a Transform Step 44 each of the stored plurality of sampled interferograms undergoes a Fourier Transform operation in the data processor 10. As a result a corresponding plurality of intensity spectra are generated by and stored in the data processor 10.

At a Comparison Step 46 the stored plurality of intensity spectra are compared to one another in the data processor 10. As a result of this relative comparison artefacts in the sampled interferogram which result from time dependent perturbations of the spectrometer system 2 are identified as frequency (or wavelength) varying components between the plurality of intensity spectra.

At an optional Correction Step 48 the stored plurality of intensity spectra are corrected to reduce the presence of the identified artefacts.

Considering now the plots of intensity against wavenumber (or frequency) v illustrated in FIG. 3 which represent spectral intensity data $S_1(v), S_2(v)$ and $S_3(v)$ and their corresponding standard deviations a',b',c' collected at three different sampling frequencies of 1200 Hz, 1500 Hz and 2700 Hz. It will be appreciated that the sampling frequency (e.g. corresponding to zero crossings of a reference laser interferogram) will reflect the scan speed of the moving mirror. Hence FIG. 3 represent spectral data $S_1(v), S_2(v)$ and $S_3(v)$ collected at three different scan speeds. It will be further appreciated that the standard deviations a',b',c' represents the signal noise.

Each intensity spectrum $S_1(v), S_2(v)$ and $S_3(v)$ is an average intensity spectrum of a plurality (here 50) spectra collected at the respective sampling frequencies of 1200 Hz, 1500 Hz and 2700 Hz. From a comparison of the standard deviation (signal noise) associated with each sampling frequency it can be observed that a contribution due to a perturbation 50,52,54 exists at a different wavenumber location for each of the sampling frequencies.

In some embodiments of the present invention, the location and/or intensity of the so determined perturbation may be employed by the data processor 10 in trouble shooting the operation of the spectrometer system, for example a warning may be provided if the intensity of the perturbation exceeds a preset threshold or spectral information may be discarded if the perturbation appears in a location interfering with information from a sample.

In other embodiments of the present invention a corrected intensity spectrum may be generated by the data processor 10 in which the effect of the perturbation is mitigated.

As an example, as shown in FIG. 4 (a), a corrected intensity spectrum S(v) having a standard deviation d' which exhibits a reduced contribution 56 of the perturbation may be generated by simply forming a mean of the intensity spectra $S_1(v), S_2(v)$ and $S_3(v)$ which were collected at the plurality of different sampling frequencies (scan speeds).

This may be considered generally for a series of spectra measured at a plurality, i, of different scan speeds (in the present example illustrated in FIG. 4 (a) 3 different scan speeds) and thus i different sampling frequencies. There will be obtained a set of spectra $S_i(v)$, where v is the wavenumber. The mean spectrum S(v) may be expressed as:

$$S(v) = [\Sigma_i S_i(v)]/i \quad (1)$$

An improvement to this simple mean calculation is illustrated in FIG. 4 (b) which shows a corrected intensity spectrum $S_{LMMSE}(v)$ having a standard deviation e' in which the contribution 58 of the perturbation is further reduced over that illustrated in FIG. 4 (a). In this example the corrected intensity spectrum $S_{LMMSE}(v)$ is generated as mean spectrum of the individual intensity spectra $S_1(v), S_2(v)$ and $S_3(v)$ each weighted according to its similarity (conversely its difference) to the mean spectrum S(v) calculated according to equation (1) above.

Generally, for each wavenumber (frequency) v in a spectrum $S_i(v)$ a measure $SM_i(v)$ may be constructed representing the similarity of each spectrum $S_i(v)$ to the mean spectrum S(v) as:

$$SM_i(v) = [S_i(v) - S(v)]^2 \quad (2)$$

The corrected intensity spectrum may then be constructed in the data processor 10 using a linear minimum mean squared estimator (LMMSE) such as given by:

$$S_{LMMSE}(v) = \quad (3)$$
$$Inv\left(\begin{bmatrix} 1 & 0 & 0 \\ 0 & 1 & 0 \\ 0 & 0 & 1 \end{bmatrix} + \begin{bmatrix} SM_1(v) & 0 & 0 \\ 0 & SM_2(v) & 0 \\ 0 & 0 & SM_3(v) \end{bmatrix} / S(v)^{\wedge}2 \right) \cdot \begin{pmatrix} S_1(v) \\ S_2(v) \\ S_3(v) \end{pmatrix}$$

The generation of the mean spectrum as the corrected intensity spectrum may be done using any one of a number of other known algorithms and mathematical techniques employed in the data processor 10. The aim of each is to compare each spectrum $S_1(v), S_2(v)$ and $S_3(v)$ and use all spectra $S_1(v), S_2(v)$ and $S_3(v)$ to form a mean where the spectra $S_1(v), S_2(v)$ and $S_3(v)$ are similar and suppress contributions of perturbations to the spectra $S_1(v), S_2(v)$ and $S_3(v)$ in the spectral regions where these contributions occur.

Here the method has been illustrated using spectra $S_1(v), S_2(v)$ and $S_3(v)$ collected at three different scan speeds. However the suppression will typically be better the greater the plurality of different scan speeds employed. This is because noise is proportional to the square root of the number, i, of different scan speeds. In regions where there is no perturbation then the noise is proportional to the square root of i. In regions where a spectrum exhibits a contribution due to a perturbation then the noise will be proportional to the square root of i−1. As the number, i, of different scan speeds employed increases then the difference between the square root of i and the square root of i−1 decreases. However, data acquisition time will naturally increase as the number of scan speeds increases. It will be appreciated that whilst a comparison of spectra obtained at two different scan speeds permits determination of a difference (i.e. that a perturbation exists) three scan speeds are the minimum needed to determine which differences are associated with a perturbation.

It will also be appreciated that whilst the data processor 10 has been described herein and illustrated in FIG. 1 as comprising a single entity the data processor 10 is not intended to be limited to such a configuration, as indeed it is not intended that such a limitation applies to the other components of a spectrometer system according to the present invention. It is envisaged that some or all of the functionality attributed to the data processor 10 may be performed in separate but interconnected elements which cooperate to perform as described in respect of the data processor 10. For example data representing the stored interferograms may be transmitted to external the spectrometer system 2, such as via a telecommunications link, to a remote location where it is processed according to the present invention, optionally to generate a corrected intensity spectrum.

The invention claimed is:

1. A spectrometer system comprising:
a scanning interferometer;
a drive system mechanically coupled to a movable reflector element of the scanning interferometer, the drive system configured to induce reciprocation of the movable reflector element at a plurality of different speeds;
a detector configured to sample interferograms formed by the scanning interferometer at the plurality of different speeds to generate a plurality of sampled interferograms; and
a data processor configured to acquire the plurality of sampled interferograms and perform a Fourier transform operation on each sampled interferogram of the plurality of sampled interferograms to generate a plurality of intensity spectra associated with the plurality of sampled interferograms, each intensity spectrum of the plurality of intensity spectra associated with a separate sampled interferogram of the plurality of sample interferograms
the data processor further configured to perform a comparison of the plurality of intensity spectra associated with the plurality of sample interferograms.

2. The spectrometer system of claim 1, wherein the drive system is configured to induce reciprocation of the movable reflector element at three different speeds.

3. The spectrometer system of claim 2, wherein the data processor is configured to
perform the relative comparison to determine a separate weighting associated with each separate intensity spectrum of the plurality of intensity spectra as a difference between the intensity spectrum and a remainder intensity spectra of the plurality of intensity spectra, and
generate a single intensity spectrum as a weighted average of the plurality of intensity spectra.

4. A method for correcting for time periodic perturbations in an interferogram generated in a spectrometer system, the method comprising:
collecting a plurality of sampled interferograms generated by a detector of the spectrometer system, each sampled interferogram of the plurality of sampled interferograms generated by the detector at a different speed of a plurality of different reciprocation speeds of a movable reflector element of the spectrometer system;
performing a Fourier transform operation on each sampled interferogram of the plurality of sampled interferograms to generate a plurality of intensity spectra, each intensity spectrum of the plurality of intensity spectra associated with a separate sampled interferogram of the plurality of sampled interferograms;
comparing the plurality of intensity spectra to identify differences between the plurality of intensity spectra; and
generating a corrected intensity spectrum to mitigate the differences.

5. The method of claim 4, wherein
the differences are stored for access by a data processor of the spectrometer system as a plurality of weightings, each weighting of the plurality of weightings associated with a separate intensity spectrum of the plurality of intensity spectra,
the weighting associated with each intensity spectrum of the plurality of intensity spectra represents a similarity between the intensity spectrum and a remainder intensity spectra of the plurality of intensity spectra, and
the corrected intensity spectrum is a weighted average of the plurality of intensity spectra.

6. The method of claim 5, wherein
the method includes calculating an average intensity spectrum as a mean of the plurality of intensity spectra in the data processor.

7. A method for correcting for time periodic perturbations in an interferogram generated in a spectrometer system, the method comprising:
collecting a plurality of sampled interferograms generated by a detector of the spectrometer system, each sampled interferogram of the plurality of sampled interferograms generated by the detector at a different speed of a plurality of different reciprocation speeds of a movable reflector element of the spectrometer system;
performing a Fourier transform operation on each sampled interferogram of the plurality of sampled interferograms to generate a plurality of intensity spectra associated with the plurality of sampled interferograms, each intensity spectrum of the plurality of intensity spectra associated with a separate sampled interferogram of the plurality of sample interferograms; and
performing a comparison of the plurality of intensity spectra associated with the plurality of sample interferograms to identify differences between the plurality of intensity spectra.

8. The method of claim 7, further comprising:
performing the relative comparison to determine a separate weighting associated with each separate intensity spectrum of the plurality of intensity spectra as a difference between the intensity spectrum and a remainder intensity spectra of the plurality of intensity spectra, and
generating a single intensity spectrum as a weighted average of the plurality of intensity spectra.

9. The method of claim 7, further comprising:
storing the differences as a plurality of weightings, each weighting of the plurality of weightings associated with a separate intensity spectrum of the plurality of intensity spectra,
wherein the weighting associated with each intensity spectrum of the plurality of intensity spectra represents a similarity between the intensity spectrum and a remainder intensity spectra of the plurality of intensity spectra.

* * * * *